United States Patent
Irshad et al.

(10) Patent No.: US 11,017,266 B2
(45) Date of Patent: May 25, 2021

(54) AGGREGATED IMAGE ANNOTATION

(71) Applicant: Figure Eight Technologies, Inc., San Francisco, CA (US)

(72) Inventors: Humayun Irshad, San Francisco, CA (US); Seyyedeh Qazale Mirsharif, San Francisco, CA (US); Kiran Vajapey, San Francisco, CA (US); Monchu Chen, San Francisco, CA (US); Caiqun Xiao, San Francisco, CA (US); Robert Munro, San Francisco, CA (US)

(73) Assignee: Figure Eight Technologies, Inc., San Francisco, CA (US)

( * ) Notice: Subject to any disclaimer, the term of this patent is extended or adjusted under 35 U.S.C. 154(b) by 99 days.

(21) Appl. No.: 16/405,852

(22) Filed: May 7, 2019

(65) Prior Publication Data
US 2019/0362185 A1    Nov. 28, 2019

Related U.S. Application Data

(60) Provisional application No. 62/669,267, filed on May 9, 2018.

(51) Int. Cl.
| | |
|---|---|
| *G06K 9/62* | (2006.01) |
| *G06N 3/08* | (2006.01) |
| *G06F 16/55* | (2019.01) |
| *G06K 9/00* | (2006.01) |
| *G06K 9/44* | (2006.01) |

(52) U.S. Cl.
CPC .......... *G06K 9/6254* (2013.01); *G06F 16/55* (2019.01); *G06K 9/00624* (2013.01); *G06K 9/44* (2013.01); *G06K 9/6212* (2013.01); *G06N 3/08* (2013.01)

(58) Field of Classification Search
CPC .............. G06K 9/6254; G06K 9/6212; G06K 9/00624; G06K 9/44; G06K 9/00664; G06K 9/3241; G06K 9/4628; G06N 3/08; G06N 20/10; G06N 20/20; G06N 5/003; G06N 3/0454; G06F 16/55
See application file for complete search history.

(56) References Cited

U.S. PATENT DOCUMENTS

| | | | |
|---|---|---|---|
| 2010/0226564 A1* | 9/2010 | Marchesotti | G06K 9/469 382/159 |
| 2014/0108302 A1* | 4/2014 | Chang | G06F 16/68 706/11 |
| 2016/0103816 A1 | 4/2016 | Grady | |

* cited by examiner

*Primary Examiner* — Christopher M Brandt
(74) *Attorney, Agent, or Firm* — Van Pelt, Yi & James LLP

(57) ABSTRACT

Image annotation includes: accessing an image and a plurality of annotation data sets for the image, wherein the plurality of annotation data sets are made by a plurality of contributors, and the image has a plurality of original image channels; aggregating the plurality of annotation data sets to obtain an aggregated annotation data set for the image; and outputting the aggregated annotation data set. Aggregating the plurality of annotation data sets to obtain an aggregated annotation data set for the image includes: generating an additional image channel based at least in part on weight averages of confidence measures of the plurality of contributors; and applying an object detection model to at least a part of the plurality of original image channels and at least a part of the additional image channel to generate the aggregated annotation data set.

23 Claims, 13 Drawing Sheets

AGGREGATED IMAGE ANNOTATION

CROSS REFERENCE TO OTHER APPLICATIONS

This application claims priority to U.S. Provisional Patent Application No. 62/669,267 entitled BOUNDING BOX AGGREGATION filed May 9, 2018 which is incorporated herein by reference for all purposes.

BACKGROUND OF THE INVENTION

Computer vision is a technology field with many applications, such as self-driving cars, warehouse management, farm management, satellite image processing, medical image recognition, etc. Machine learning (ML) has been applied to many computer vision problems. Examples (also referred to as training data) are sent to a machine learning model, which adapts based on the training data to improve its recognition capabilities.

Training machine learning models to recognize and distinguish particular objects from each other often requires a large number of samples. For instance, to recognize whether an object is a car or a person requires sending to a machine learning model a large number of training data samples, most of which depict a car, a person, or both. To generate large example data sets required for training and building machine learning models, existing techniques typically require human annotators to manually annotate objects in images (e.g., to draw bounding boxes around cars or people in images). This is referred to as crowd-sourced annotation.

Different annotators may annotate the objects differently. For example, they may draw different sized bounding boxes around the same object or label the same object differently. Different sets of annotation data by different annotators on the same images often cannot be easily combined. For example, suppose that three annotators each drew a different bounding box around a car in a photo. Simple techniques for combining the different results, such as taking an average of the boundaries of the bounding boxes, will not always result in the most accurate bounding box. A more accurate technique for combining annotation results is therefore desired. Further, since a large number of annotations are often required for training a particular model, the technique should also be computationally efficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Aggregation of bounding boxes annotated by multiple contributors of an annotation platform is disclosed. In some embodiments, an image and a plurality of annotation data sets for the image are accessed, where the annotation data sets are made by a plurality of contributors and the image has a plurality of original image channels. The annotation data sets are aggregated to obtain an aggregated annotation data set. Specifically, an additional image channel is generated based at least in part on weight averages of confidence measures of the contributors. An object detection model is applied to at least a part of the original image channels and at least a part of the additional image channel to generate the aggregated annotation data set. The aggregated annotation data set is output to be stored, used for training other machine learning models, other image processing applications, etc.

Figure 1:
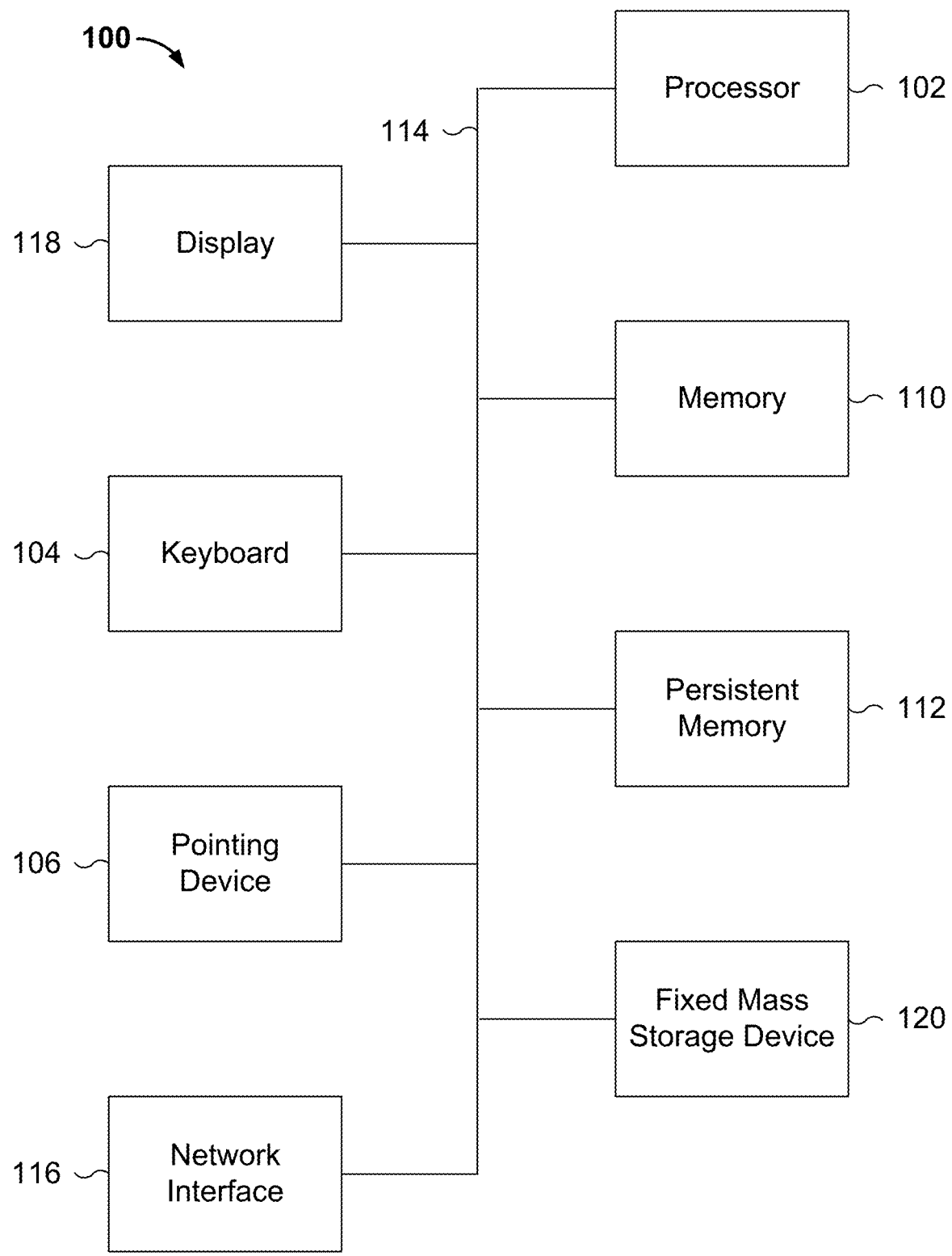
FIG. 1 is a functional diagram illustrating a programmed computer system for performing bounding box aggregation in accordance with some embodiments.

FIG. 1 is a functional diagram illustrating a programmed computer system for performing aggregated annotation in accordance with some embodiments. As will be apparent, other computer system architectures and configurations can be used to perform aggregated annotation. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to implement platform 200 and/or aggregator 208 of FIG. 2 and perform processes such as 300 of FIG. 3.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
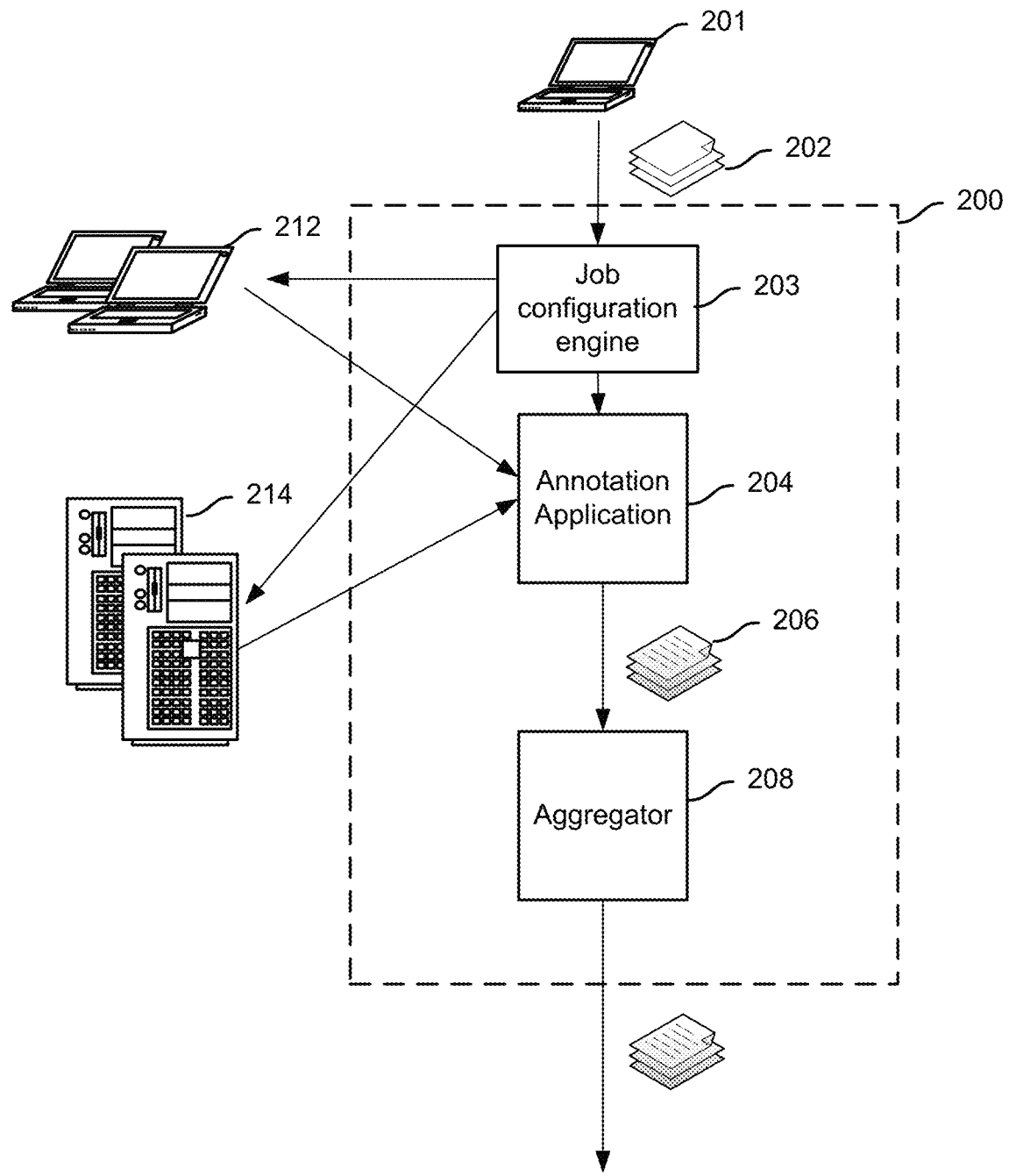
FIG. 2 is a system diagram illustrating an embodiment of a crowd-sourced annotation platform.

FIG. 2 is a system diagram illustrating an embodiment of a crowd-sourced annotation platform. In this example, annotation platform 200 can be a Figure Eight® annotation platform and can be implemented on one or more devices such as 100, on a cloud-based platform, or the like. The annotation platform provides user interface components and logic for requesters to request jobs and for contributors to complete jobs.

As shown, a requester (e.g., a customer of the platform) uses device 201 to access annotation platform 200 and provides a set of images 202 to the annotation platform for annotation. The requester can interact with annotation platform 200 using a browser-based application, a standalone client application, or the like.

A job configuration engine 203 provides user interfaces and logic for the requester to specify the requirements for an annotation job, such as the images to be annotated, the specific types of objects to be annotated, the definitions for these types of objects, whether to annotate half an object, whether to annotate objects in the background, etc. The requester interacts with job configuration engine 203 on the platform to configure the job, providing requirements and payment information. The annotators working on the job can be human users of the platform or ML-based annotation processes trained to make annotations. Any appropriate ML model capable of annotating (e.g., locating and classifying) objects in an image can be used, such as convolutional neural networks (CNNs), Hand Craft features based ML classifiers like Random Forest, support vector machines, etc. In some embodiments, the requester selects the specific annotators to work on the job. In some embodiments, the human annotators also have the options of accepting or declining a job. The human annotators and the ML-based annotation processes participating in the annotation process are referred to as contributors.

Annotation application 204 can be implemented on, for example, a server or a plurality of servers on a cloud, and provides user interface tools and processing logic for human annotators to perform annotation on the images (e.g., draw boundary boxes around objects, label objects' types, etc.), store annotation data, etc. Optionally, the annotation application can also provide tools and/or application programming interfaces to ML-based annotation processes to invoke machine annotation functions, store annotation data, etc. The contributors perform annotation on original images 202 to generate annotated images 206. Since the individual contributors may not always agree on how to annotate a particular object (for example, human users and different ML models may draw different bounding boxes for the same object, classify the same object differently, etc.), there can be multiple annotation data sets for the same image.

In some embodiments, an HTML canvas with Javascript is used to implement the user interface on clients such as 212 and provide a front end for the annotator user to draw or adjust bounding boxes around objects of interest, record the classification names of objects, etc. In some embodiments, a graphic user interface is implemented in a browser and a browser-based overlaying HTML element is used. In these cases, a browser-based implementation displays images and an HTML canvas is overlaid over the image that is displayed. The canvas is an HTML element that allows user interactions, enabling a user to input an annotation by drawing a bounding box onto the canvas. In this manner, a user is able to interact by, for example, clicking and dragging a pointer to draw a box around an object in an image. In some embodiments, as an annotation is made or a box is drawn around an object, an object identifier or ID is associated with the annotation or box, and a post is sent to the server.

The server collects the annotated images (including the original images and their corresponding annotation data sets) and sends the information to an aggregator 208, which aggregates the annotation data sets by, among other things, using an additional image channel generated based at least in part on a weighted average of confidence measures associated with the contributors. Details of the aggregation are described below. An aggregated annotation data set is generated for each image. The aggregated annotation data set more accurately annotates the objects in the image than the annotation data set provided by a single contributor. The aggregated annotation data sets for the images are output, and can be stored, used to train other machine learning models, or further processed.

Figure 3:
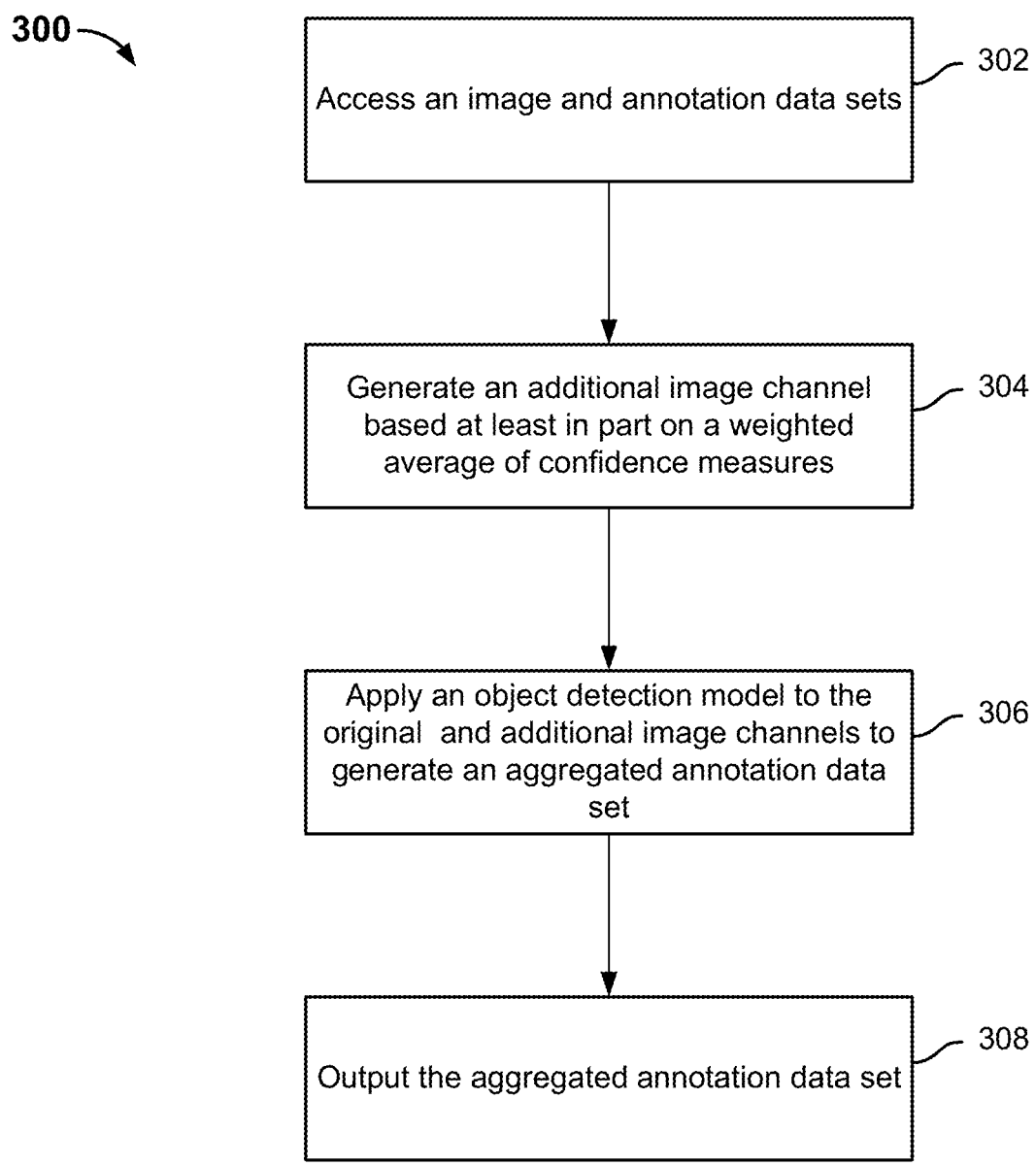
FIG. 3 is a flowchart illustrating an embodiment of a process for aggregating annotation results from multiple sources.

FIG. 3 is a flowchart illustrating an embodiment of a process for aggregating annotation results from multiple sources. Process 300 can be performed on, for example, system 100 of FIG. 1 or platform 200 of FIG. 2.

In process 300, an image and a plurality of annotation data sets for the image are accessed (302). An additional image channel is generated based at least in part on a weighted average of confidence measures (304). An object detection model is applied to the original and additional image channels to generate an aggregated annotation data set (306). The aggregated annotation data set is output (308).

At 302, an image and a plurality of annotation data sets for the image are accessed. The image and annotation data sets can be provided by an image annotation platform. The image can be represented using RGB (red, green, blue), HSL (hue, saturation, lightness), HSV (hue, saturation, value), and/or any other appropriate format. The following examples will discuss the RGB representation extensively but the technique is also applicable to other representations. In this example, the annotation data sets are made by a plurality of corresponding contributors such as human annotators, ML-based annotation processes trained to make annotations, or both. As discussed above, the annotations made by different contributors can differ for the same object in the image. For example, different contributors may draw different sized bounding boxes and/or label the object differently.

Figure 4:
FIG. 4 is a diagram illustrating an example of an annotated image.

FIG. 4 is a diagram illustrating an example of an annotated image. In this example, the image has been annotated by multiple contributors, including human users and/or ML-based annotation processes. The annotation data includes the bounding boxes around objects in the image, and their labels (e.g., "car," "building," etc.). The labels are recorded using a separate user interface component and are not shown in this figure. In this case, the contributors are asked to annotate people in the image. While rectangular boxes are shown and discussed extensively in the examples below, the bounding boxes can be other shapes such as circles, other types of polygons, etc. The annotation data can include coordinates of the bounding boxes, texts or identifiers for the classification labels of objects, as well as confidence measures of the contributor. In this case, the image data and the annotation data are stored separately (e.g., in a separate image file and annotation data file). In some other embodiments, the image data and annotation data can be stored together (e.g., the image data embeds the boundary boxes information as metadata).

As shown in the annotated image, the contributors sometimes are in nearly perfect agreement on how an object is annotated (e.g., person 402), and the bounding boxes are well-aligned. More frequently, however, the contributors annotate the same object differently, and the bounding boxes can overlap yet are not well-aligned (e.g., person 404, where multiple distinct bounding boxes are drawn). As will be described in greater detail below, aggregation is performed to more precisely determine a bounding box for the not well-aligned cases.

Returning to FIG. 3, at 304-306, the plurality of annotation data sets are aggregated to obtain an aggregated annotation data set for the image. In particular, at 304, an additional image channel is generated for the image. An embodiment of a process for generating the additional image channel is described further in connection with FIGS. 5 and 6A-6E. At 306, an ML-based object detection model is applied to the original image channels and the additional image channel to generate the aggregated annotation data set. An embodiment of a process for generating the aggregated annotation data set is described in connection with FIGS. 5 and 7-10. As will be discussed in greater detail below, an aggregated annotation data set generated using this technique more precisely describes/bounds the objects in the image than an annotation data set that is derived by simply averaging the pixels in the annotation data sets.

At 308, the aggregated annotation data set is output. The aggregated annotation data set can be stored, displayed to the requester, sent to another machine learning system as training data, and/or used by other suitable applications.

Figure 5:
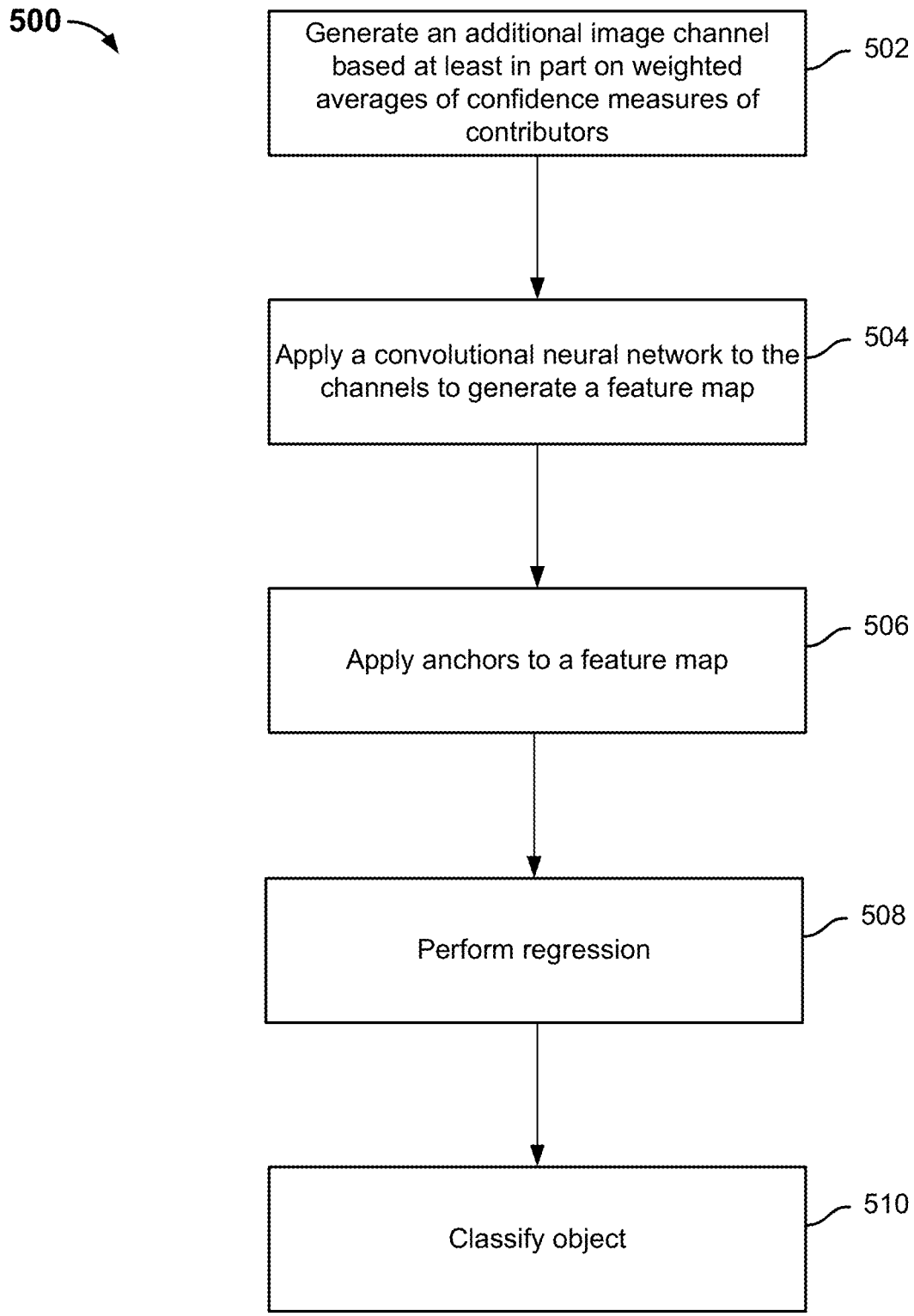
FIG. 5 is a flowchart illustrating an embodiment of a process for aggregating the plurality of annotation data sets.

FIG. 5 is a flowchart illustrating an embodiment of a process for aggregating the plurality of annotation data sets. Process 500 can be used to implement 304-306 of process 300.

Assume that the initial image without annotation is an image with three standard RGB channels. At 502, an additional image channel is generated based at least in part on weighted averages of confidence measures of the contributors that performed the annotations. Depending on implementation, the additional image channel can be generated for multiple objects in the image (if all the images are to be processed together), or for a single object in the image (if each object is to be processed separately). The additional image channel is generated based on the other original image channels (e.g., RGB channels) for the object. Thus, multiple additional image channels are processed for the objects in the image. In some embodiments, an additional image channel is generated for a plurality of objects in the image, based on the other original image channels (e.g., RGB channels) for the plurality of objects.

In this example, a contributor can be a human user or an ML-based annotation process. A confidence measure is associated with a user or an ML-based annotation process that annotates the image. In some cases, a confidence measure associated with a user is referred to as a trust score, and a confidence measure associated with an ML-based annotation process is referred to as a confidence level. In other words, if the annotation is obtained from a human contributor, the trust score is used to generate the additional image channel; if the annotation is obtained from an ML-based annotation process, the confidence level is used to generate the additional image channel.

The trust score for a human annotator is computed based on the accuracy of the annotator in annotating (e.g., drawing boxes around) objects correctly on test question images. The test question images refer to images in a job that have already been correctly annotated by experts and that are used to check the quality of the annotator's work. Accuracy is computed for each human annotator for each job based on accurately labeled objects in test question images. In some embodiments, accuracy is computed as:

$$\text{accuracy} = \frac{\text{true positive}}{\text{true positive} + \text{false negative} + \text{false positive}} \quad (1)$$

The confidence score of an ML-based annotation process specifies the probability of the annotation, and is computed by the ML-based process to indicate how confident the process is in making the particular annotation.

In various embodiments, a pixel in the additional image channel is associated with a value that depends on whether the pixel is within any bounding boxes. In this example, each pixel is initialized to 0, and each time a pixel is found within a bounding box, the corresponding confidence measure of the contributor who created the bounding box is added to the corresponding pixel value. In other words, a sum of associated confidence measures of the pixel location relative to the bounding boxes is determined as the pixel value.

Figure 6A:
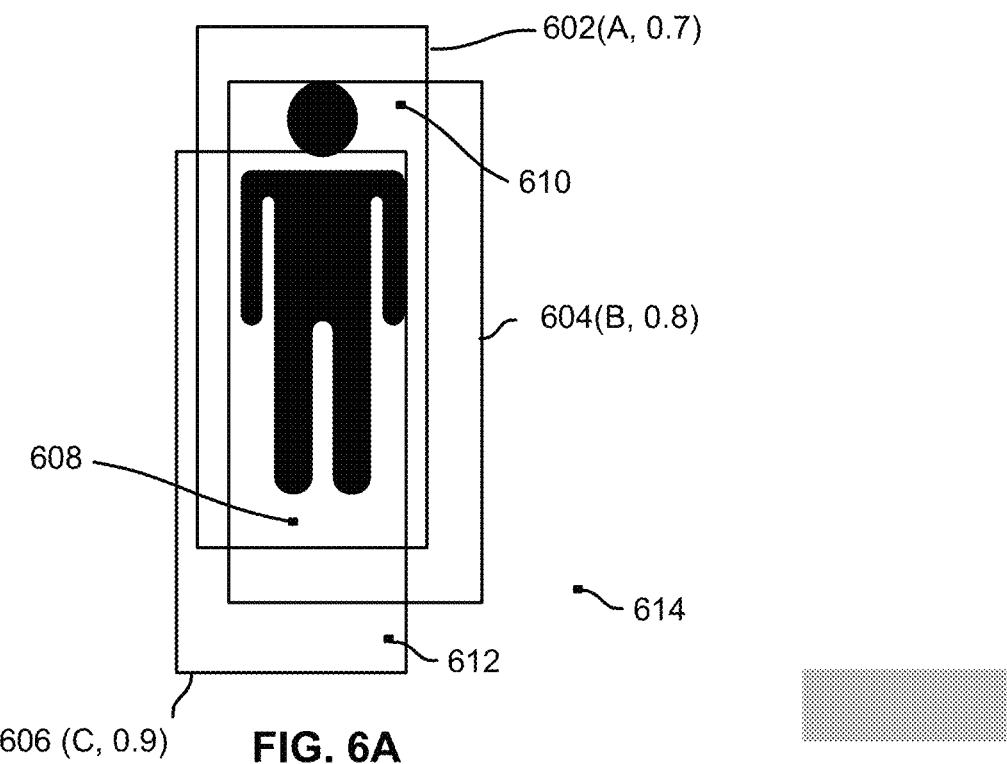
FIG. 6A is a diagram illustrating a portion of an example of a portion of an image that has multiple annotation boxes.

FIG. 6A is a diagram illustrating a portion of an example of a portion of an image that has multiple annotation boxes. In this example, a person in the image portion is annotated by three bounding boxes 602, 604, and 606, which are made by three contributors A, B, and C, respectively. A, B, and C have confidence measures of 0.7, 0.8, and 0.9, respectively.

In some embodiments, pixels within a bounding box are associated with the same value (e.g., confidence value) relative to that bounding box. If the pixel is within multiple bounding boxes, the same pixel can be associated with multiple values (e.g., multiple confidence measures). Accordingly, the value of each pixel in the additional image channel is computed based at least in part on the sum of the confidence measures associated with the pixel. In some embodiments, the following formula is used:

$$\text{pixel value} = \frac{\text{sum of confidence measures at the pixel location}}{\text{sum of all confidence measures}} \quad (2)$$

In some embodiments, each pixel in the additional image channel is computed using this formula. For example, pixel 608, which is inside all three boxes, has a pixel value of $(0.7+0.8+0.9)/(0.7+0.8+0.9)=1$. Pixel 610, which is inside boxes 602 and 604 but outside box 606, has a value of $(0.7+0.8)/(0.7+0.8+0.9)=0.625$. Pixel 612, which is only inside box 606, has a value of $0.9/(0.7+0.8+0.9)=0.375$. Pixel 614, which is not inside any of the bounding boxes, has a pixel value of 0.

Figure 6B:
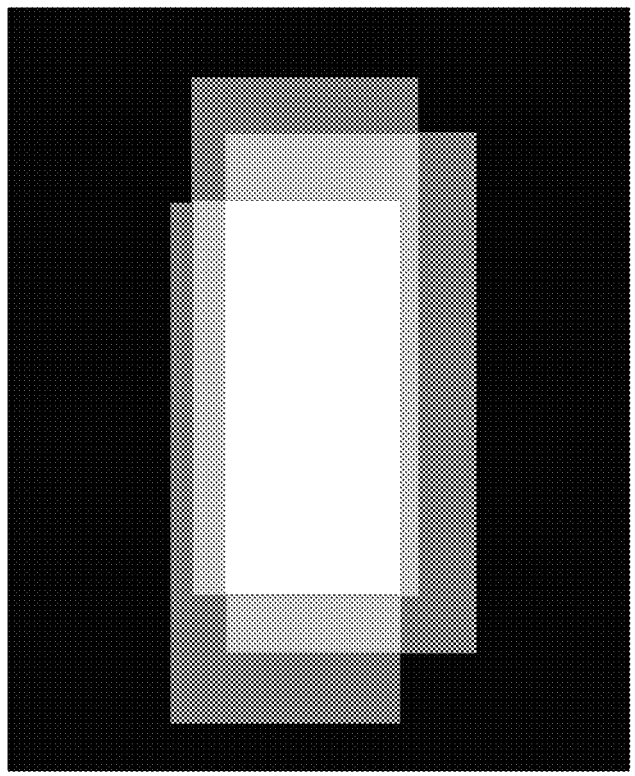
FIG. 6B is a diagram illustrating the resulting additional image channel of the annotated image portion shown in FIG. 6A.
Figure 6C:
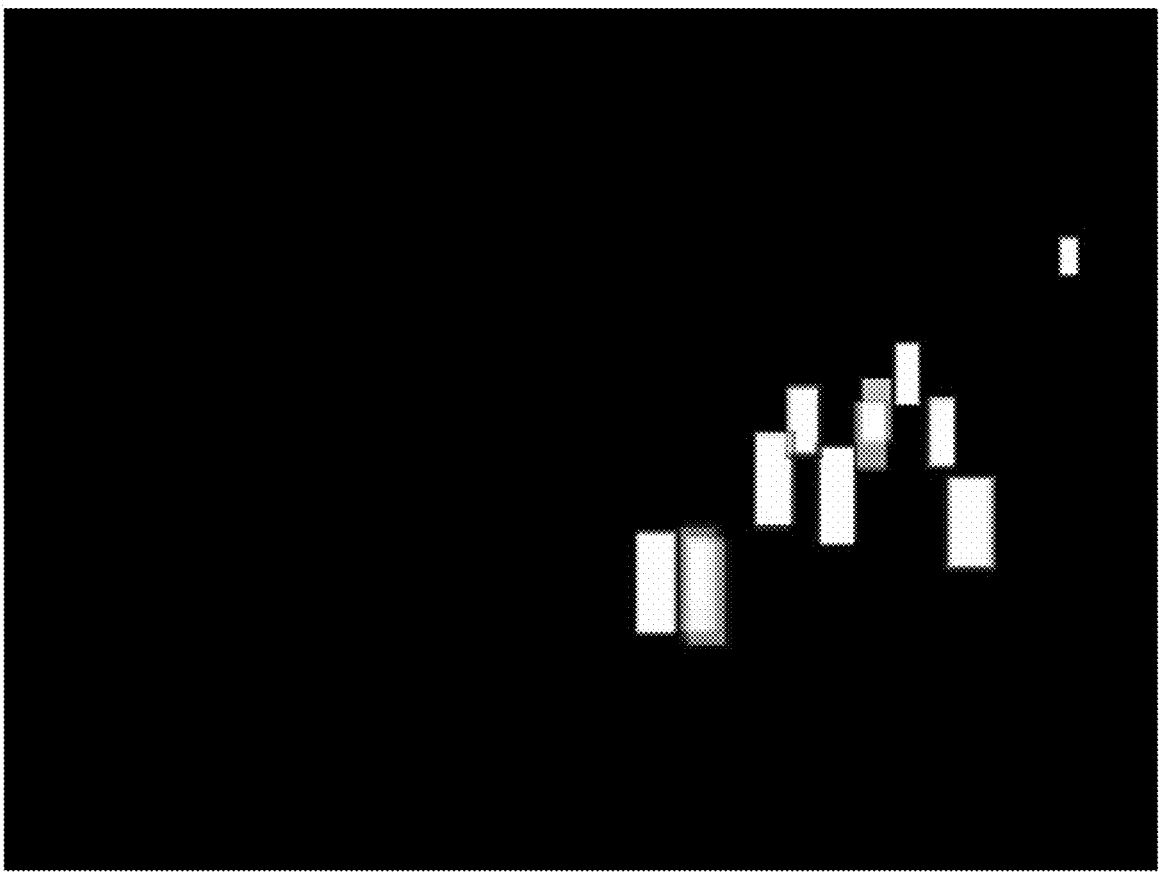
FIG. 6C is a diagram illustrating the resulting additional weighted image channel for an annotated image example such as the one shown in FIG. 4.

FIG. 6B is a diagram illustrating the resulting additional image channel of the annotated image portion shown in FIG. 6A. Lighter shading indicates greater pixel value. FIG. 6C is a diagram illustrating the resulting additional weighted image channel for an annotated image example similar to the one shown in FIG. 4.

In some embodiments, different formulas can be used to compute the pixel values in the additional image channel. For example:

$$\text{pixel value} = \frac{\text{sum of confidence measures at the pixel location}}{\text{total number of contributors}} \quad (3)$$

Thus, pixels 608, 610, 612, and 614 have values corresponding to weighted average confidence measures of $2.4/3=0.8$, $1.5/3=0.5$, $0.9/3=0.3$, and $0/3=0$, respectively. Other formulas can be used in other embodiments.

Figure 6D:
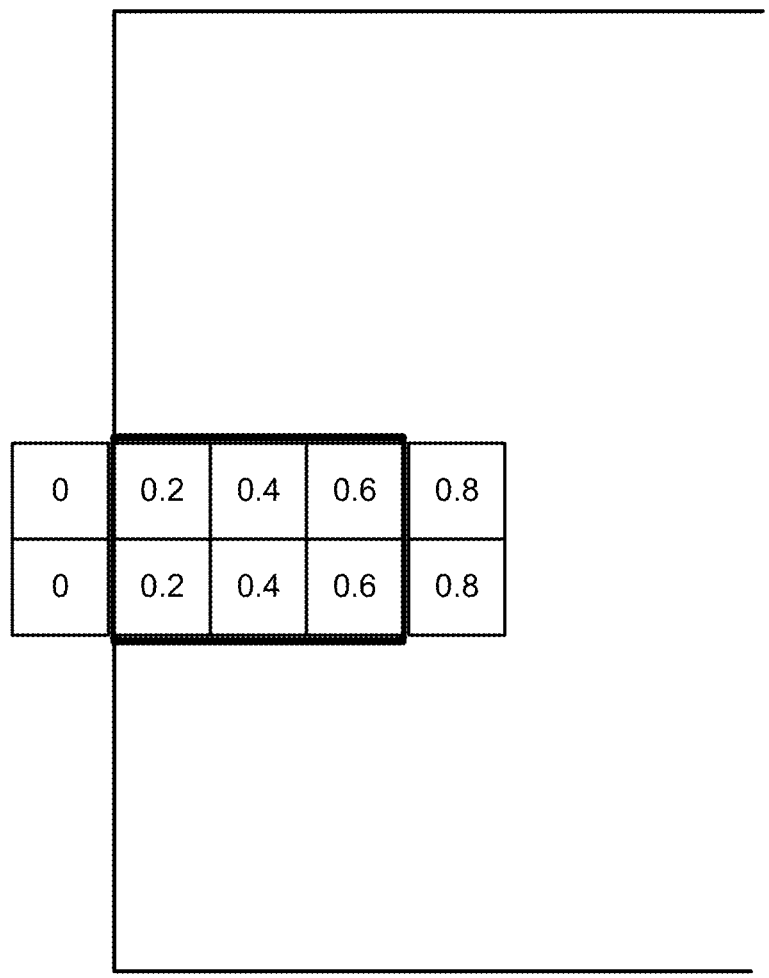
FIG. 6D illustrates an example of an edge that has been smoothed.

In the above example, pixels within a bounding box are initially associated with the same value. In some embodiments, in order to provide more precise information about where the objects start or stop, the edges of the annotation bounding boxes are smoothed prior to the computation of the additional image channel. In particular, a pre-specified number of pixels near the edge are penalized in terms of their initial pixel values. FIG. 6D illustrates an example of an edge that has been smoothed. Multiple columns or rows of pixels next to the edge are penalized in terms of their pixel values and receive reduced value compared with pixels in the center of the object. In this case, a band of three pixels next to the edge is penalized. Other values can be used in other embodiments. Specifically, assuming that the pixels in the center of the bounding box created by contributor A are associated with a confidence measure of A (which in this example is 0.8), the pixels on the very edge but still within the bounding box are associated with $$\frac{1}{3+1}A = \frac{1}{4}A,$$

the pixels in the next column or row toward the center are associated with ½ A, the third next column or row towards the center is associated with ¾ A, and the fourth next column or row and those beyond are associated with A. The associated values of pixels within bounding boxes by other contributors are computed in a similar fashion. The pixels' associated values relative to the bounding boxes are summed to compute the weighted average confidence measures according to formulas such as (4) or (5). As a result, the pixels on the edges of the bounding boxes will have lower pixel values than without edge smoothing.

Other smoothing techniques can be used in other embodiments. For example, different numbers of columns or rows of pixels can be penalized, and the pixels in these columns or rows can be given different weights.

Figure 6E:
FIG. 6E illustrates an example of an additional weighted image channel resulting from smoothed edges.

FIG. 6E illustrates an example of an additional weighted image channel resulting from smoothed edges. Edge smoothing provides better accuracy for identifying bounding boxes for objects that are in clusters (e.g., objects that are touching or overlapping).

Returning to FIG. 5, in 504-510, the original channels of the image (e.g., the RGB channels) as well as the additional image channel are input into an object detection model (also referred to as a deep learning model) that identifies features in the image (504), applies anchors to feature maps (506), performs regression (508), and optionally performs classification (510). The channels can be represented as matrices whose entries correspond to the pixel values.

At 504, a convolutional neural network (CNN) is applied on the four channels to identify the features (e.g., objects) in the image. The CNN is a type of deep learning neural network for analyzing images and identifying features. Any appropriate CNN implementation can be used, such as Faster RCNN, SSD or YOLO, customized to work with four channels instead of the standard three. In this example, a three-dimensional matrix is used to represent the channels (with dimensions X and Y corresponding to height and width of the images, and dimension Z corresponding to the channels). The matrix is sent to the CNN as input. The CNN includes multiple layers, where the first layer applies a convolutional filter to the input and each subsequent layer applies a different convolutional filter to the output of the previous layer. The successive layers each detect a specific type of data (usually a higher level of feature than the previous layer). For example, the first CNN layer detects edges in horizontal, vertical, or diagonal directions, the second CNN layer detects curves based on the previously detected edge data, and the third layer detects features, etc. Additional layers can be used.

Figure 7:
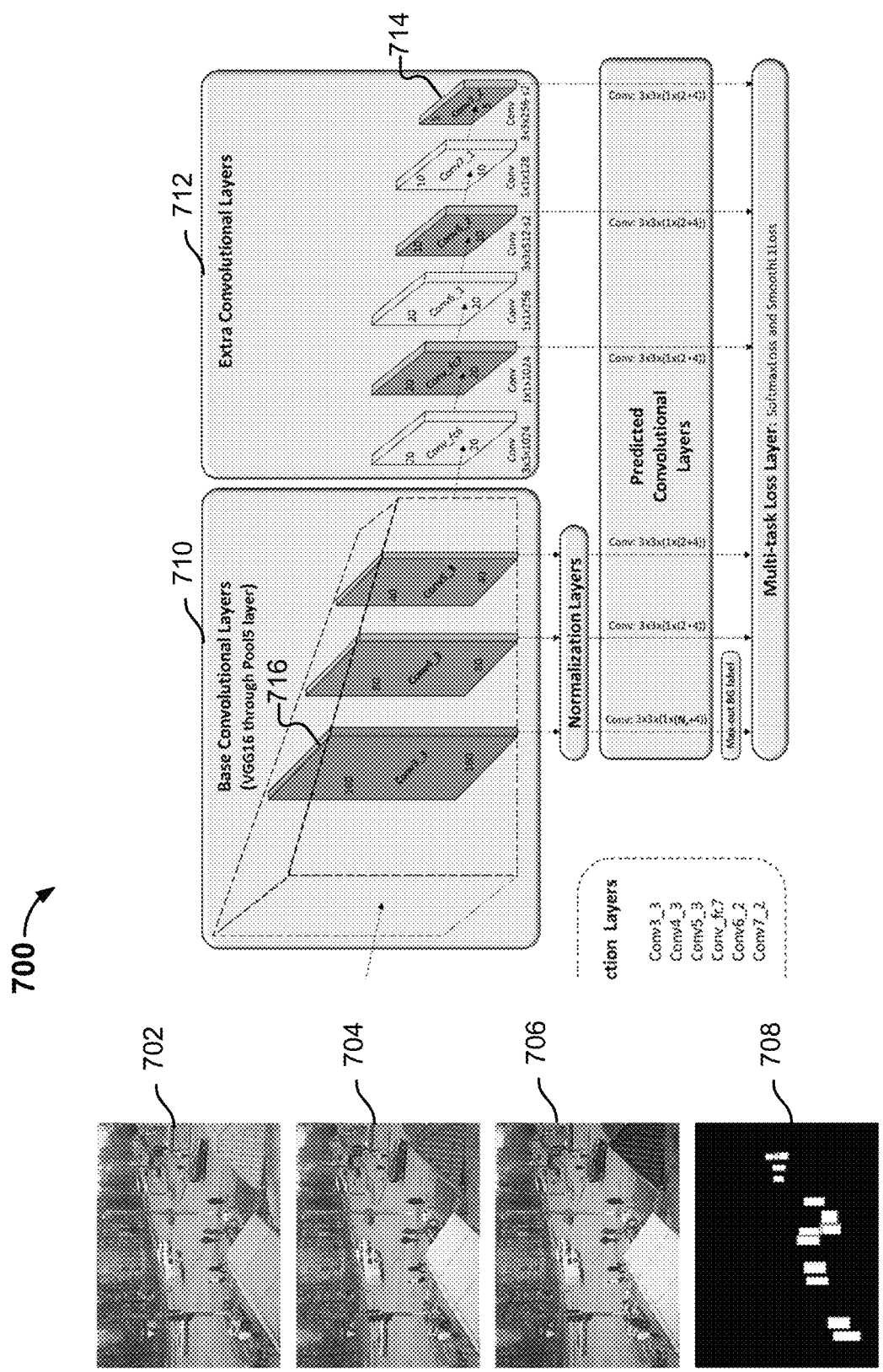
FIG. 7 is a block diagram illustrating an example of a convolutional neural network used to generate a feature map based on a four-channel input.

FIG. 7 is a block diagram illustrating an example of a convolutional neural network used to generate a feature map based on a four-channel input. In this example, 702-706 are the R, G, and B channels, respectively. 708 is the additional image channel derived based on the weighted average of the confidence measures, and can correspond to the channel represented in FIG. 6C or FIG. 6E. The CNN employs a multi-scale approach where different convolutional layers use convolutional filters of different sizes to detect objects at different scales and output feature maps at different scales. Specifically, input channels 702-708 are applied to convolutional layers in stages 710 and 712 to extract features in the image. As shown, stage 710 includes base convolutional layers that produce initial/earlier stage features and stage 712 includes additional convolutional and pooling layers that further reduce the feature map size by concentrating on the features in smaller area. Each convolutional layer generates a feature map that indicates the pixels that possibly correspond to the features (e.g., the objects) in the image. The sizes of features detected by different convolutional layers are different. Earlier convolutional layers that uses fewer filters and detect smaller objects than later convolutional layers that use more filters and detect bigger objects. For example, layer 714 can be used to detect bigger objects (e.g., objects in the foreground) than layer 716.

Figure 8:
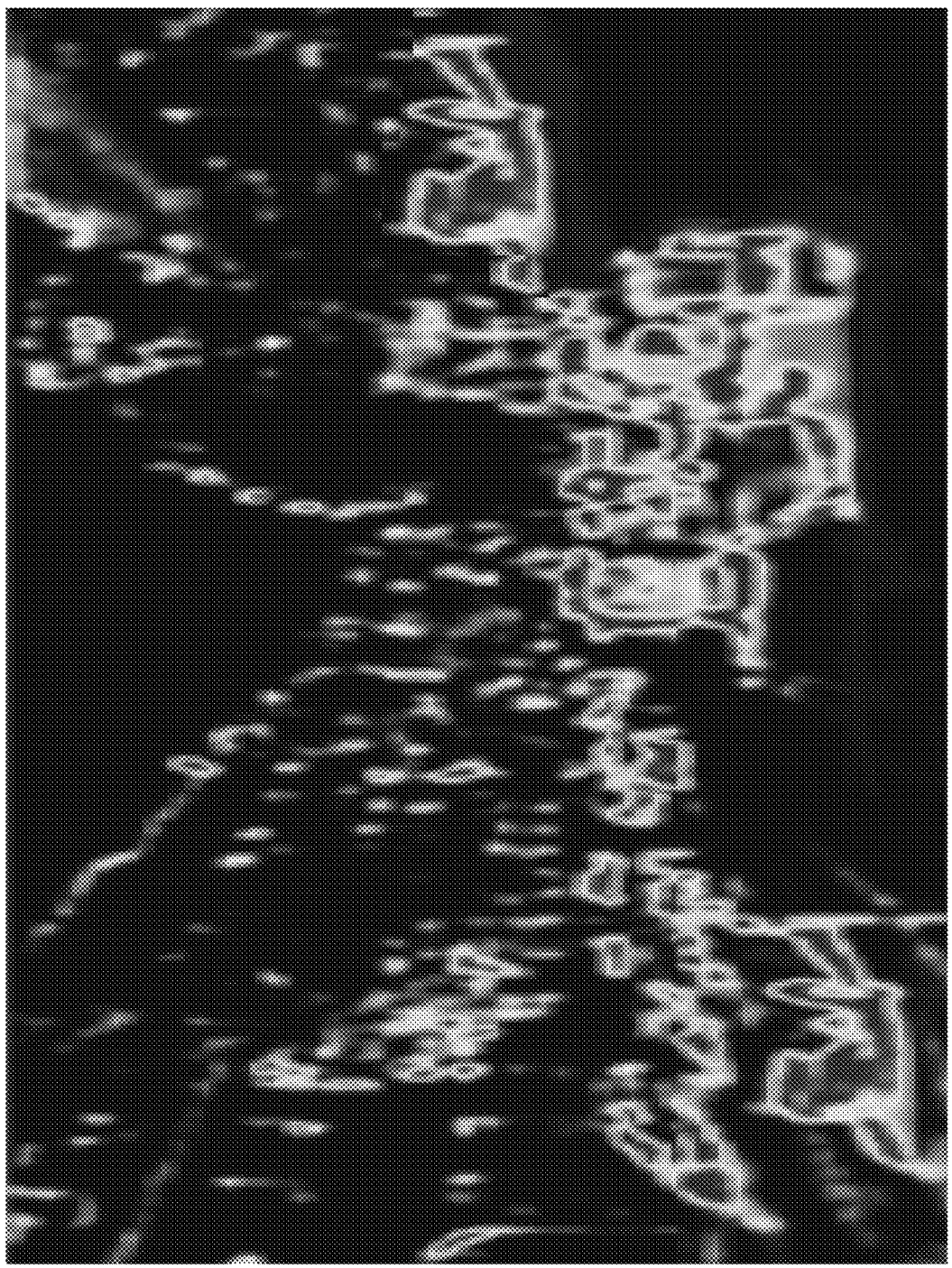
FIG. 8 is an example of a feature map generated by a layer of convolutional neural network 700.

FIG. 8 is an example of a feature map generated by a layer of convolutional neural network 700. In this example, the feature map is generated by a CNN layer such as 714 of FIG. 7. Where a pixel likely corresponds to an object, the pixel value in the feature map is higher (and brighter). In other words, the feature map identifies the features (objects) by distinguishing the foreground (which corresponds to the objects) and the background (which corresponds to the rest of the image).

Figure 9:
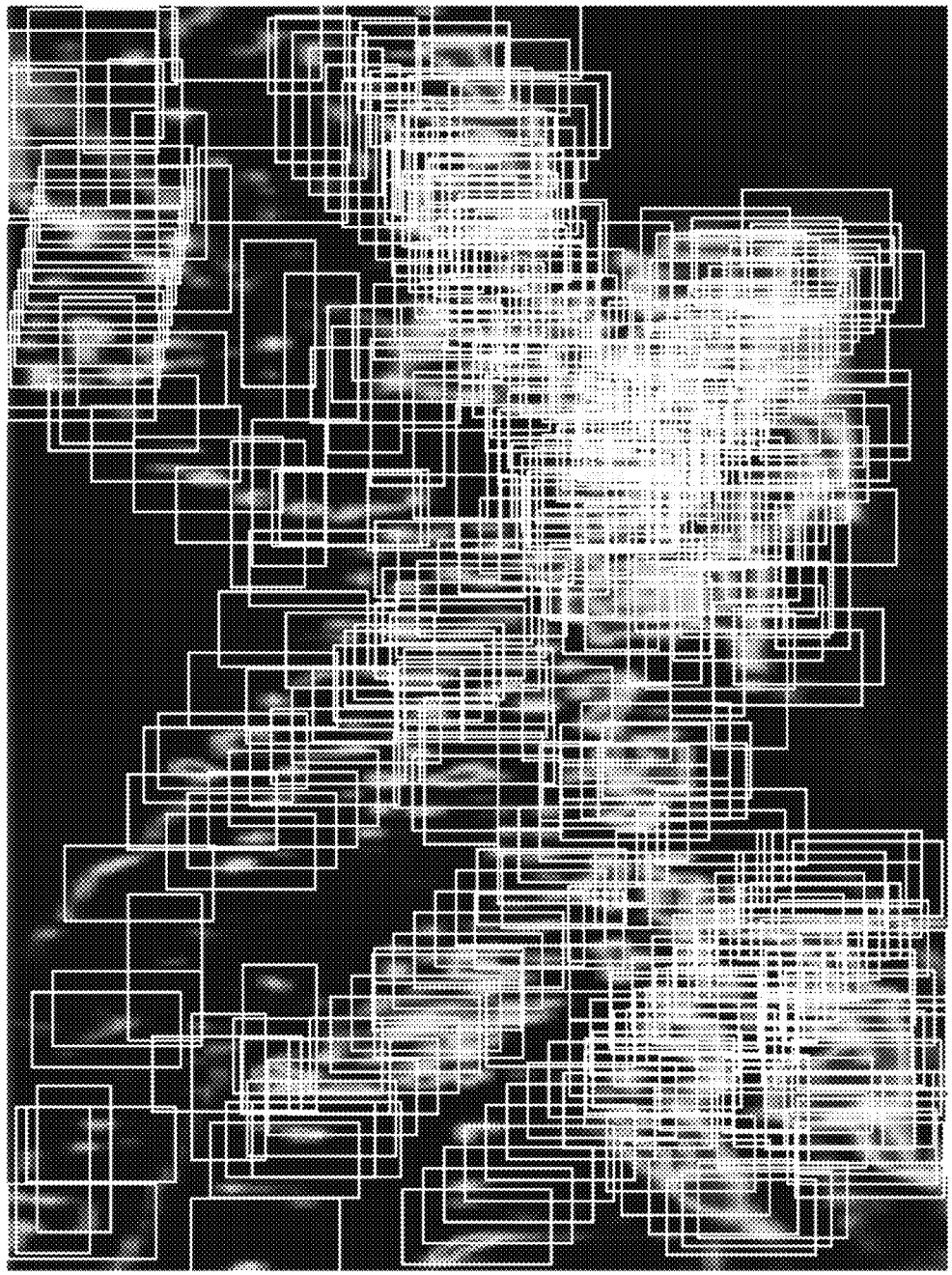
FIG. 9 is a diagram illustrating example anchors applied to the example feature map of FIG. 8.

Returning to FIG. 5, at 506, anchors are applied to the feature map. As used herein, an anchor refers to a machine generated boundary box that is added to the feature map near a feature location. For a given feature on the feature map, a set of anchors is generated heuristically. In some embodiments, the anchors are randomly or pseudo randomly generated to have different sizes and/or aspect ratios (within a preset amount of deviation). In some embodiments, a regional proposal network is used to apply anchors on a feature map. A regional proposal network identifies the regions in the feature map based on higher values. Another alternative is to use the sliding window approach to apply anchors on the feature map. Other anchor generation/application heuristics can be used. FIG. 9 is a diagram illustrating example anchors applied to the example feature map of FIG. 8.

Returning to FIG. 5, at 508, regression is performed. For a specific object, regression changes the centroid of the bounding box and weight and height of the bounding box. In other words, regression adjusts the coordinates of anchors for an object to find the best fitting bounding box that includes the most pixels that belong to the object and the least pixels that belong to the background. An anchor box can be stretched, shrunk, moved, etc. to provide the best fit for the object. Linear regression is used in this example but or other appropriate regression techniques can be used.

In some cases, the initial annotation of the image has been classified. For example, the annotated image only includes annotations for people in the image. In such cases, no additional classification is required. In other cases where the initial annotation of the image has not been classified, an optional classification is performed at 510. In particular, the anchors resulting from the regression are used to extract the object pixels and send them to a classifier. Based on the input object pixels, the classifier's model will determine the corresponding types for the objects. The classifier can be pre-trained to recognize certain types of objects (e.g., person, car, building, etc.) using techniques such as fully connected layers with soft max function, support vector machine, etc. The classifier can be implemented using Tensorflow or other appropriate libraries. In some embodiments, a classification library function gives the classification result an associated confidence score, indicating the confidence level for the classification result being correct (e.g., 90% confidence in the object being a car).

Figure 10:
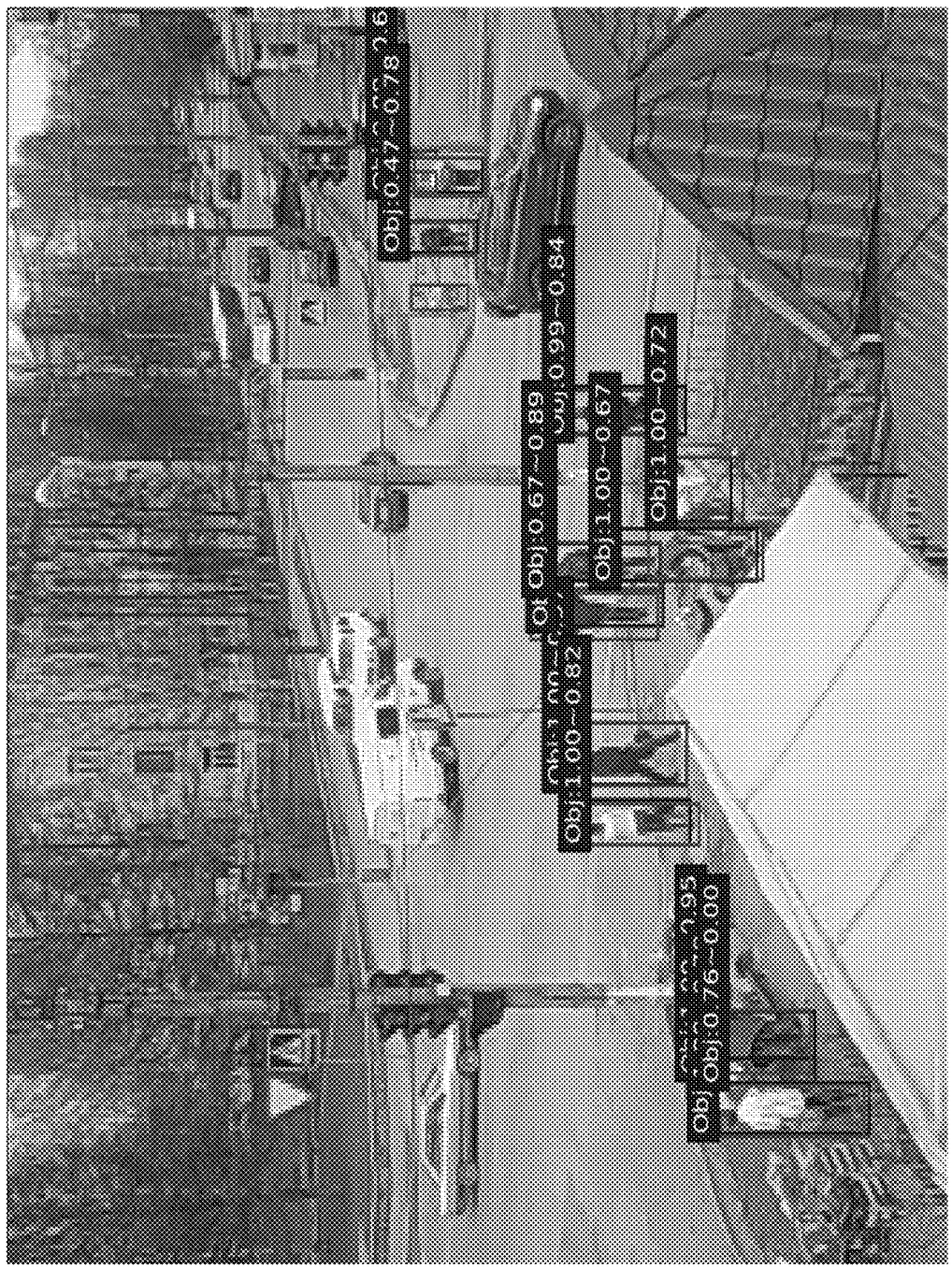
FIG. 10 is an example of an image that includes an aggregated annotation data set.

FIG. 10 is an example of an image that includes an aggregated annotation data set. Compared with the initial image with multiple annotation data sets shown in FIG. 4, the aggregated bounding boxes in FIG. 10 more precisely bound the desired objects (in this case, people) in the images.

Aggregated image annotation has been disclosed. By introducing an additional weighted image channel and applying object detection, the result of the aggregated technique provides more precise bounding boxes for objects in the image than individual contributors, and allows for faster and more accurate generation of training data for other machine learning systems.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of image annotation, comprising:
accessing an image and a plurality of annotation data sets for the image, wherein the plurality of annotation data sets are made by a plurality of contributors, and the image has a plurality of original image channels;
aggregating the plurality of annotation data sets to obtain an aggregated annotation data set for the image, including:
generating an additional image channel based at least in part on weight averages of confidence measures of the plurality of contributors, wherein a confidence measure of a contributor indicates an accuracy of the contributor in making annotations or how confident the contributor is at making an annotation; and
applying an object detection model to at least a part of the plurality of original image channels and at least a part of the additional image channel to generate the aggregated annotation data set; and
outputting the aggregated annotation data set.

2. The method of claim 1, wherein the generating of the additional image channel includes determining, for a pixel in the image, a sum of associated values with respect to one or more bounding boxes.

3. The method of claim 2, wherein the associated values with respect to the one or more bounding boxes are associated with the confidence measures of the plurality of contributors.

4. The method of claim 1, wherein the generating of the additional image channel includes, for a pixel in the image, dividing a sum of confidence measures at a pixel location of the pixel by a sum of confidence measures of the plurality of contributors.

5. The method of claim 1, wherein the generating of the additional image channel includes, for a pixel in the image, dividing a sum of confidence measures at a pixel location of the pixel by a number of contributors.

6. The method of claim 1, wherein the generating of the additional image channel includes:

performing edge smoothing on a plurality of bounding boxes included in the plurality of annotation data sets; and
determining, for a pixel in the image, a sum of associated values with respect to one or more edge-smoothed bounding boxes.

7. The method of claim 1, wherein the additional image channel is generated for a plurality of objects in the image.

8. The method of claim 1, wherein the additional image channel is generated for a single object in the image.

9. The method of claim 1, wherein the applying of the object detection model includes:
generating a feature map based at least in part on the image and the additional image channel.

10. The method of claim 9, further comprising:
applying a plurality of anchors to a feature in the feature map; and
regressing based on the plurality of anchors to determine a best fitting bounding box.

11. The method of claim 10, further comprising classifying the feature.

12. A system for image annotation, comprising:
one or more processors configured to:
access an image and a plurality of annotation data sets for the image, wherein the plurality of annotation data sets are made by a plurality of contributors, and the image has a plurality of original image channels;
aggregate the plurality of annotation data sets to obtain an aggregated annotation data set for the image, including to:
generate an additional image channel based at least in part on weight averages of confidence measures of the plurality of contributors; wherein a confidence measure of a contributor indicates an accuracy of the contributor in making annotations or how confident the contributor is at making an annotation; and
apply an object detection model to at least a part of the plurality of original image channels and at least a part of the additional image channel to generate the aggregated annotation data set; and
output the aggregated annotation data set; and
one or more memories coupled to the one or more processors and configured to provide the one or more processors with instructions.

13. The system of claim 12, wherein to generate the additional image channel includes to determine, for a pixel in the image, a sum of associated values with respect to one or more bounding boxes.

14. The system of claim 13, wherein the associated values with respect to the one or more bounding boxes are associated with the confidence measures of the plurality of contributors.

15. The system of claim 12, wherein to generate the additional image channel includes, for a pixel in the image, to divide a sum of confidence measures at a pixel location of the pixel by a sum of confidence measures of the plurality of contributors.

16. The system of claim 12, wherein to generate the additional image channel includes, for a pixel in the image, to divide a sum of confidence measures at a pixel location of the pixel by a number of contributors.

17. The system of claim 12, wherein to generate the additional image channel includes to:
perform edge smoothing on a plurality of bounding boxes included in the plurality of annotation data sets; and determine, for a pixel in the image, a sum of associated values with respect to one or more edge-smoothed bounding boxes.

18. The system of claim 12, wherein the additional image channel is generated for a plurality of objects in the image.

19. The system of claim 12, wherein the additional image channel is generated for a single object in the image.

20. The system of claim 12, wherein to apply the object detection model includes to:
   generate a feature map based at least in part on the image and the additional image channel.

21. The system of claim 20, wherein the one or more processors are further configured to:
   apply a plurality of anchors to a feature in the feature map; and
   regress based on the plurality of anchors to determine a best fitting bounding box.

22. The system of claim 21, wherein the one or more processors are further configured to classify the feature.

23. A computer program product for image annotation, the computer program product being embodied in a tangible non-transitory computer readable storage medium and comprising computer instructions for:
   accessing an image and a plurality of annotation data sets for the image, wherein the plurality of annotation data sets are made by a plurality of contributors, and the image has a plurality of original image channels;
   aggregating the plurality of annotation data sets to obtain an aggregated annotation data set for the image, including:
      generating an additional image channel based at least in part on weight averages of confidence measures of the plurality of contributors; wherein a confidence measure of a contributor indicates an accuracy of the contributor in making annotations or how confident the contributor is at making an annotation; and
      applying an object detection model to at least a part of the plurality of original image channels and at least a part of the additional image channel to generate the aggregated annotation data set; and
   outputting the aggregated annotation data set.

* * * * *